L. CHAPMAN.
Improvement in Plows.
No. 123,330. Patented Feb. 6, 1872.
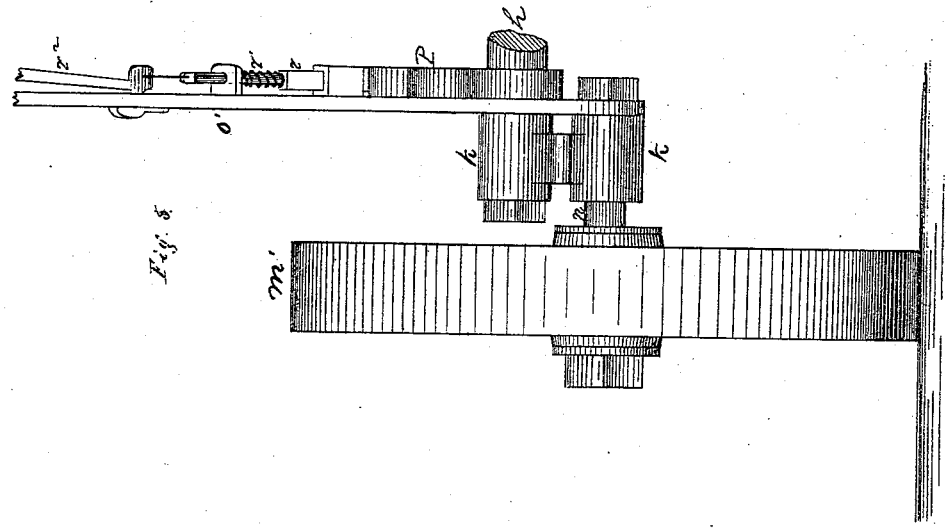
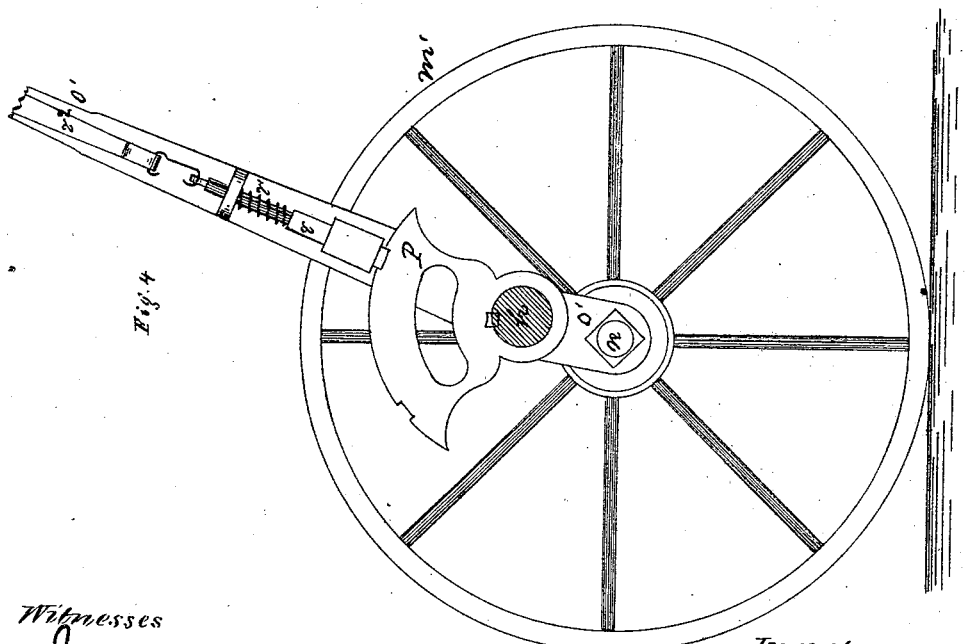

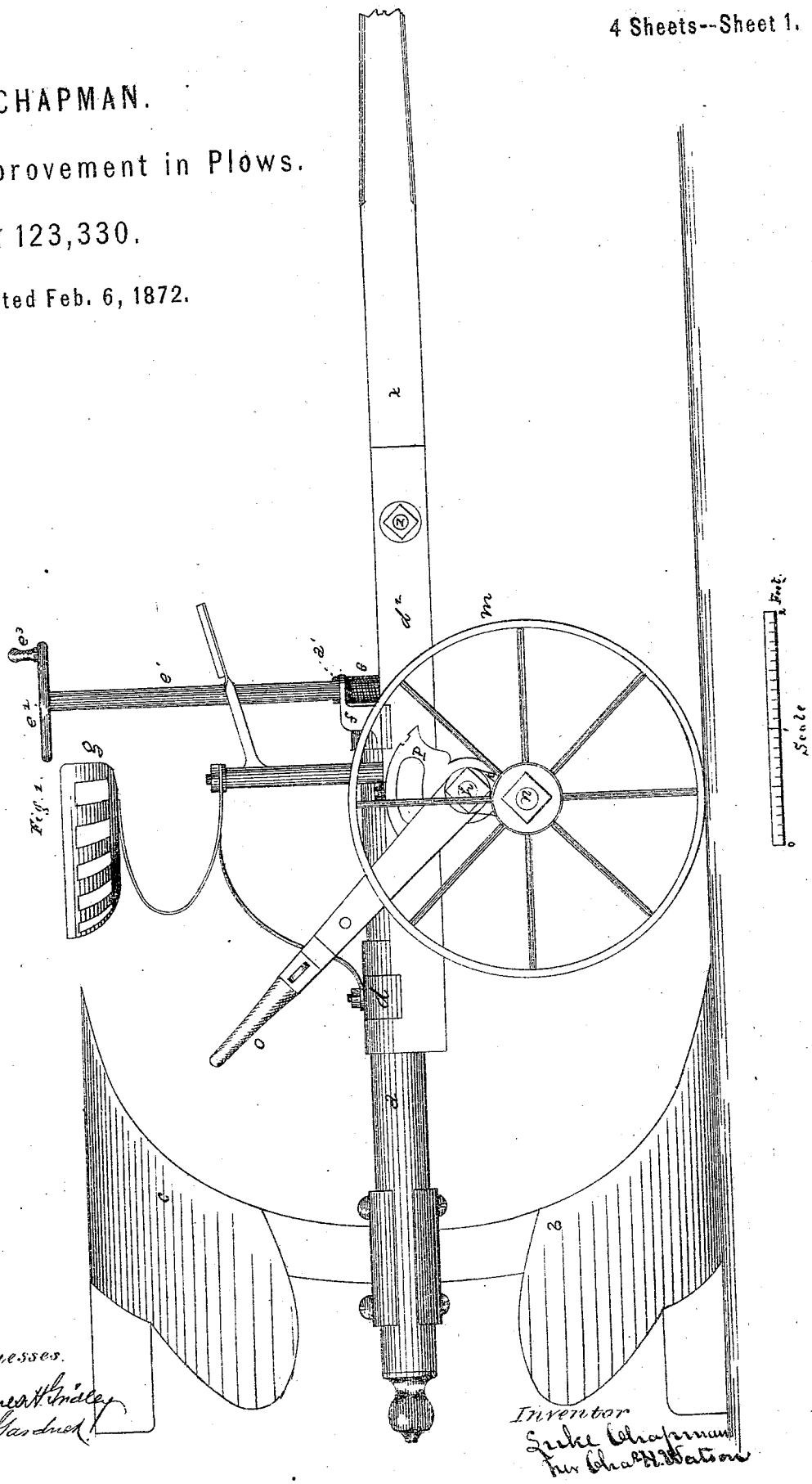

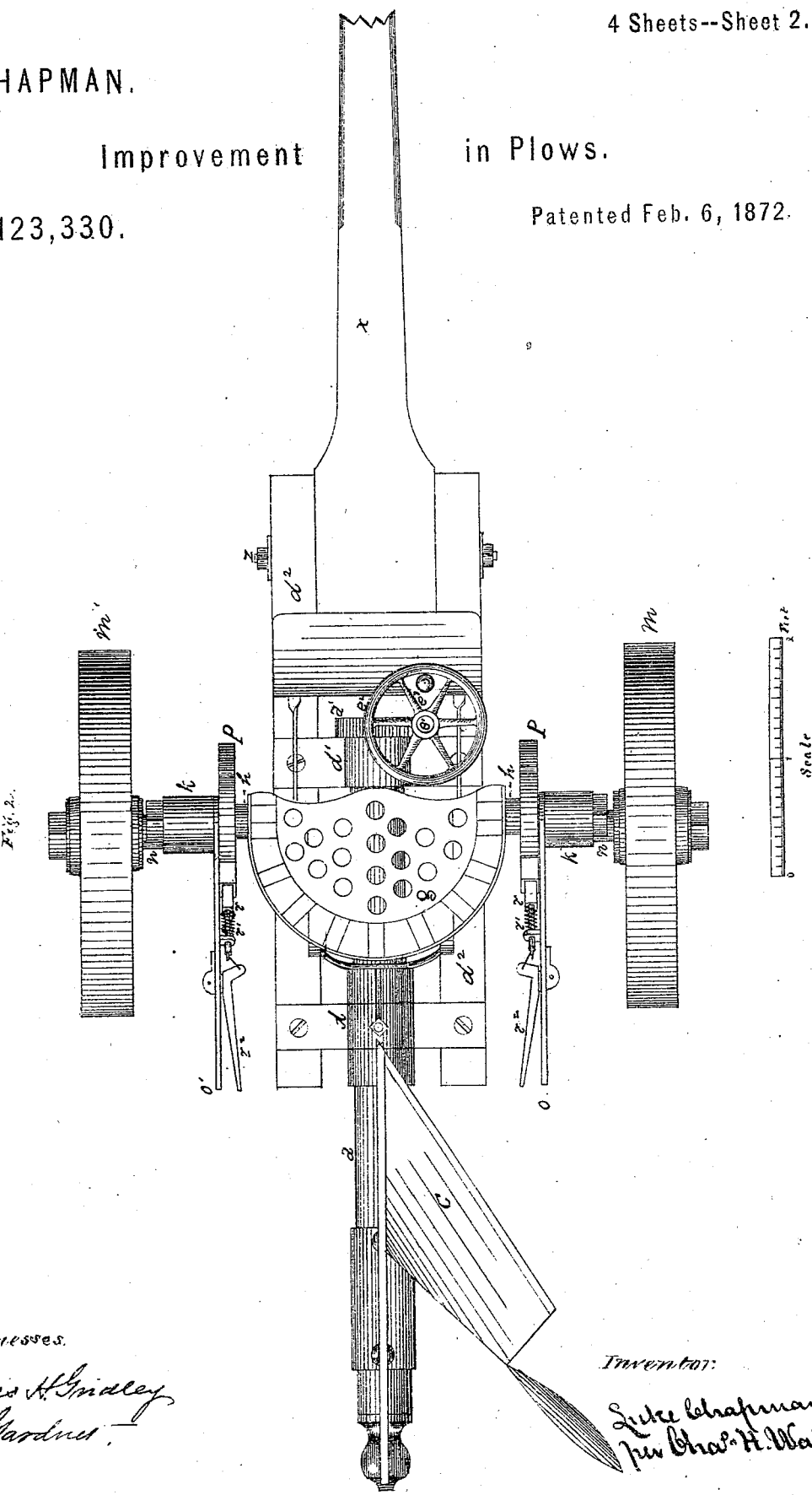

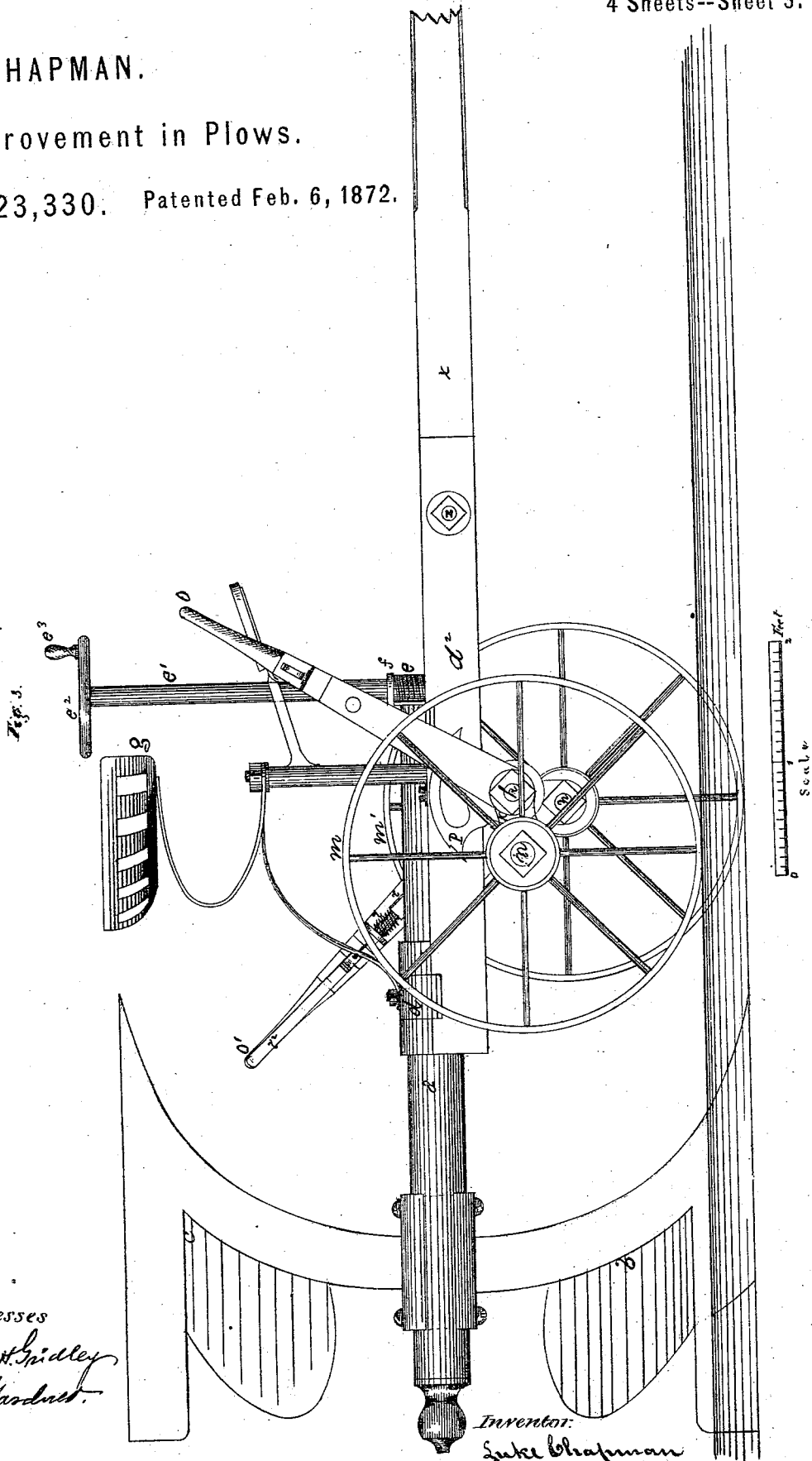

UNITED STATES PATENT OFFICE.

LUKE CHAPMAN, OF COLLINSVILLE, CONNECTICUT, ASSIGNOR TO HIMSELF AND THE COLLINS COMPANY, OF SAME PLACE.

IMPROVEMENT IN PLOWS.

Specification forming part of Letters Patent No. 123,330, dated February 6, 1872.

SPECIFICATION.

I, LUKE CHAPMAN, of Collinsville, in the county of Hartford and State of Connecticut, have invented a new and Improved Reversible Plow, of which the following is a specification:

The object of this invention is to produce a machine having both a right and left hand plow, either of which can be used at will, thus allowing the plowman to throw his furrow to the right or left hand, as he may desire, thus creating uniformity of surface, and obviating all necessity for back furrowing and dead furrows, so destructive to all farming machinery subsequently used, especially reapers and harvesters.

In the accompanying drawing, Figure 1 is a side elevation of the device with both its wheels running upon the same level and the undermost plow entirely out of the ground. Fig. 2 is a plan view of the device in the same position as in Fig. 1. Fig. 3 is a side elevation of the device with the left-hand plow at work, the first furrow having been taken. Fig. 4 is a detached side view, on an enlarged scale, of one of the wheels supporting the body of the device, together with the apparatus for raising and lowering one end of the main axle. Fig. 5 is a detached enlarged front view of the parts shown in Fig. 4.

All the views are to be turned to the right in reading.

The letter $a$ indicates the plow-beam, to which are attached the right-hand plow $b$ and the left-hand plow $c$. They are, preferably, attached on opposite sides of the beam, though they might be attached at some angle to each other. This plow-beam $a$ rotates in bearings $d$ and $d^1$ attached to the frame $d^2$. Its rotary movement is given and controlled by the worm $e$ upon the shaft $e^1$, meshing into the worm-wheel $a'$ upon the beam $a$. The shaft $e^1$ is hung in bearings $f$, which take hold upon it just above and just below the worm-gear, and the shaft extends upward to just in front of the operator's seat $g$, where it has a wheel, $e^2$, and crank-handle, $e^3$, whereby the operator can turn it and thus rotate the plows. The main axle $h$ is fast to the frame $d^2$. At either end of the axle are hung crank-arms $k$ $k$, which turn on the main axle. To their extremities are rigidly fastened the wheel-axles $n$ $n$, on which are hung the wheels $m$ $m'$. At either side of the operator, and next the cranked axles, are hung levers $o$ and $o'$, whose construction and operation are precisely alike. The levers turn on the main axle $h$, and are fastened to the wheel-axles at their lower extremities, so that when these levers are swung back and forth the crank-arms will swing with them, and thus elevate or depress the main axle. Segments $p$ $p$ are secured to and extend upward from the main axle, in the circular surface of which are stops or notches at various points, into which the lower ends of the stop-bars $r$ will catch when desired, thus regulating the height at which the main axle and its appendages shall be held. These stop-bars, which slide in ways on the inner sides of the levers $o$ and $o'$, are pressed down by the spiral springs $r^1$, and are raised upward when desired by means of the stop-levers $r^2$, pivoted on the inner sides of the levers $o$ $o'$, so that, at the same time that the operator grasps one of the levers $o$ $o'$, he can, by the same grasp, operate the stop-levers $r^2$.

There are four principal positions of adjustment in which it is necessary to use this machine: First, in adjustment for transportation from one place to another when being drawn about; second, in adjustment for taking the first furrow on land as yet unbroken, using for this first furrow, say, the right-hand plow; third, in adjustment for taking the second furrow with the left-hand plow; fourth, in adjustment for taking the third furrow with the right-hand plow.

With reference to the first position of adjustment: In this adjustment both the levers $o$ and $o'$ are thrown back, as shown in Fig. 1. The undermost plow is now out of the ground, and it will be generally found advisable to revolve the beam $a$ so that the plows will both stand out horizontally from the beam, thus raising them high above the ground.

With reference to the second position of adjustment: In this adjustment both the levers $o$ $o'$ are thrown forward to the position of the lever $o$ in Fig. 3, the right-hand plow being brought down undermost for service. This throws the undermost plow down below the level of the bottom of the wheels, which now run on the same level ready to take the earth. The depth of the furrow can be regulated by the distance to which the levers are thrown forward.

With reference to the third position of adjustment: In this adjustment the left-hand plow is brought undermost, and the position of the levers $o$ $o'$ is exactly as shown in Fig. 3. This throws the wheel $m'$ down to the level of the bottom of the furrow, in which it must now run, and leaves the wheel $m$ at the level of the unbroken land, on which it now runs.

With reference to the fourth position of adjustment: In this adjustment the right-hand plow is brought undermost, and the levers $o$ $o'$ exactly the reverse of the positions shown in Fig. 3. This throws the wheel $m$ down to run in the furrow, and leaves the wheel $m'$ at the proper height to run on the land.

In either of the last two adjustments the depth of the furrow will be regulated by the distance to which the forwardmost lever is thrown forward.

In plowing all subsequent furrows after the third the positions of adjustment will be alternately those of the third and fourth adjustment; this, of course, if the operator plows back and forth across the field, each furrow next its predecessor.

The pole of the machine $x$ fits in snugly, at its rear end, between the two forward parts of the frame, and is supported therein by a bolt, $z$, having a head upon one end and a nut upon the other.

In using the plow it will often be necessary, obviously, that the frame and the pole be rigid together, and such rigidity can be attained by tightening the nut on the end of this bolt, although, ordinarily, in practice it will be desirable to leave the pole $x$ free to be adjusted to every depth of furrow.

I claim as my invention—

1. The frame $d$ $d^1$ $d^2$, provided with the journals rigidly attached thereto, in combination with the rotary plow-beam $a$, provided with the right and left plows $b$ $c$, substantially as described.

2. The rotating standard $e^1$, provided with wheel or crank and handle $e^2$ $e^3$, arranged to be operated by the driver, in combination with the bearing $f$ and rotating plow-beam $a$, substantially as and for the purpose set forth.

LUKE CHAPMAN.

Witnesess:
W. I. WOOD,
E. H. SEARS.